(No Model.)

T. R. BEVANS.
CARRIAGE SPRING.

No. 292,200. Patented Jan. 22, 1884.

Attest.
Jno. C. Perkins
Levi W. Slaughter

Inventor.
Thomas R. Bevans
per Lucius C. West
Atty.

UNITED STATES PATENT OFFICE.

THOMAS R. BEVANS, OF KALAMAZOO, MICHIGAN.

CARRIAGE-SPRING.

SPECIFICATION forming part of Letters Patent No. 292,200, dated January 22, 1884.

Application filed May 1, 1883. (No model.)

*To all whom it may concern:*

Be it known that I, THOMAS R. BEVANS, a citizen of the United States, residing at Kalamazoo, county of Kalamazoo, State of Michigan, have invented a new and useful Carriage-Spring, of which the following is a specification.

The object of my invention is to effect certain improvements in carriage-springs, to facilitate their operation and increase their utility.

Figure 1:
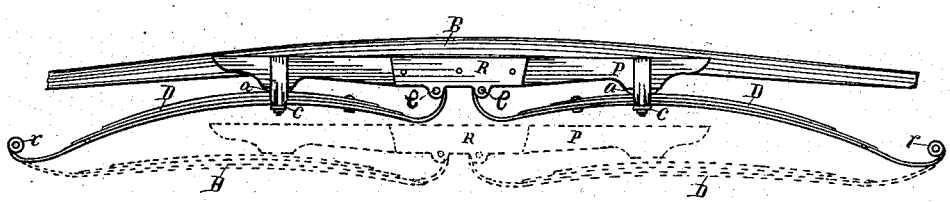
Figure 2:
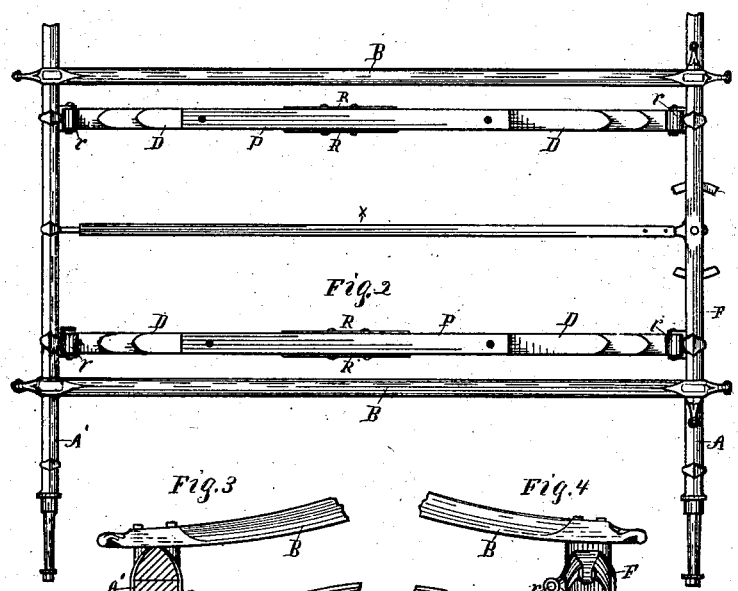
Figure 3:
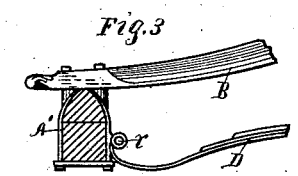
Figure 4:
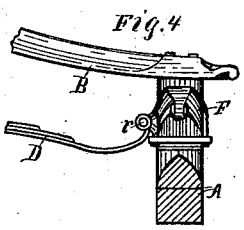
Figure 5:

In the drawings forming a part of this specification, Figure 1 is a side elevation of the spring; Fig. 2, a top view of a vehicle running-gear, illustrating a use of the spring; Figs. 3 and 4, cross-section of the axles on a line with side bar, B; and Fig. 5, a broken portion of Fig. 1, with one side of clip $c$ removed.

The complete spring is composed of two springs, D D, of elliptical form, with the ends curved back in the opposite direction and terminating in the usual eyes, and a bolster, P, with which one end of each spring D is pivotally or loosely connected at $ee$ on the under side of said bolster. The bolster has a convex bearing-surface, $a$, resting on the bow of each spring D, Figs. 1 and 5. The parts at these points $a$ $a$ are loosely confined by clips $c$ $c$, thus leaving the springs free from rigid connection with the bolster and clip. In the use of the spring, the other end, $r$, of each spring D is pivotally or loosely connected with its support. The support in the device shown in Fig. 2 consists in the axle A' for the rear end, and the bolster F for the forward end. Two of the complete springs are used, and may be located lengthwise or crosswise of a running-gear, and connected to any proper supports. The carriage-box (not here shown) is located on the bolsters P P.

By referring to Fig. 1, it will be observed that the springs D D have no rigid connections at any point, and that the ends pivoted to the bolster P at $e$ $e$ are on a higher plane than the ends $r$ $r$, when the spring is in its normal position. When the spring is borne down upon the springs D D, they yield throughout their entire length. When the burden is sufficiently heavy, the ends at $e$ $e$ are carried to a plane below that of the ends $r$ $r$, as shown by dotted lines in Fig. 1. Thus the usual lengthening of elliptic springs, which heretofore retarded their elastic action, is compensated for, and the action of the spring is as prompt and just the same with a light burden at a plane above the ends $r$ $r$ as with a heavy burden at the plane below.

The utility and operation of such a construction and association of parts may be further understood by considering that if the springs D D were all one spring continuous through the center the elastic effect would be nearly destroyed, and entirely destroyed if either or all of the parts at $a$ $a$ or $e$ $e$ were rigidly connected.

I am aware that side springs pivoted to the axles and buggy-body have heretofore been used to dispense with side bars; hence this I do not claim.

Having thus described my invention, what I claim, and desire to secure by Letters Patent, is—

The combination, with a pair of springs which are loosely supported at each outer end and located end to end in the same horizontal line beneath a bolster, of a bolster having a bearing-surface at each end loosely resting on the springs, and centrally and loosely connecting with the inner end of each spring between the bearing-points of said bolster, substantially as set forth.

In testimony of the foregoing I have hereunto subscribed my name in the presence of two witnesses.

THOMAS R. BEVANS.

Witnesses:
ASEH W. ROWLEY,
W. H. BROWN.